H. H. WEST.
CIRCULAR KNITTING MACHINE.
APPLICATION FILED MAR. 4, 1914.
1,122,560.
Patented Dec. 29, 1914.
7 SHEETS—SHEET 1.
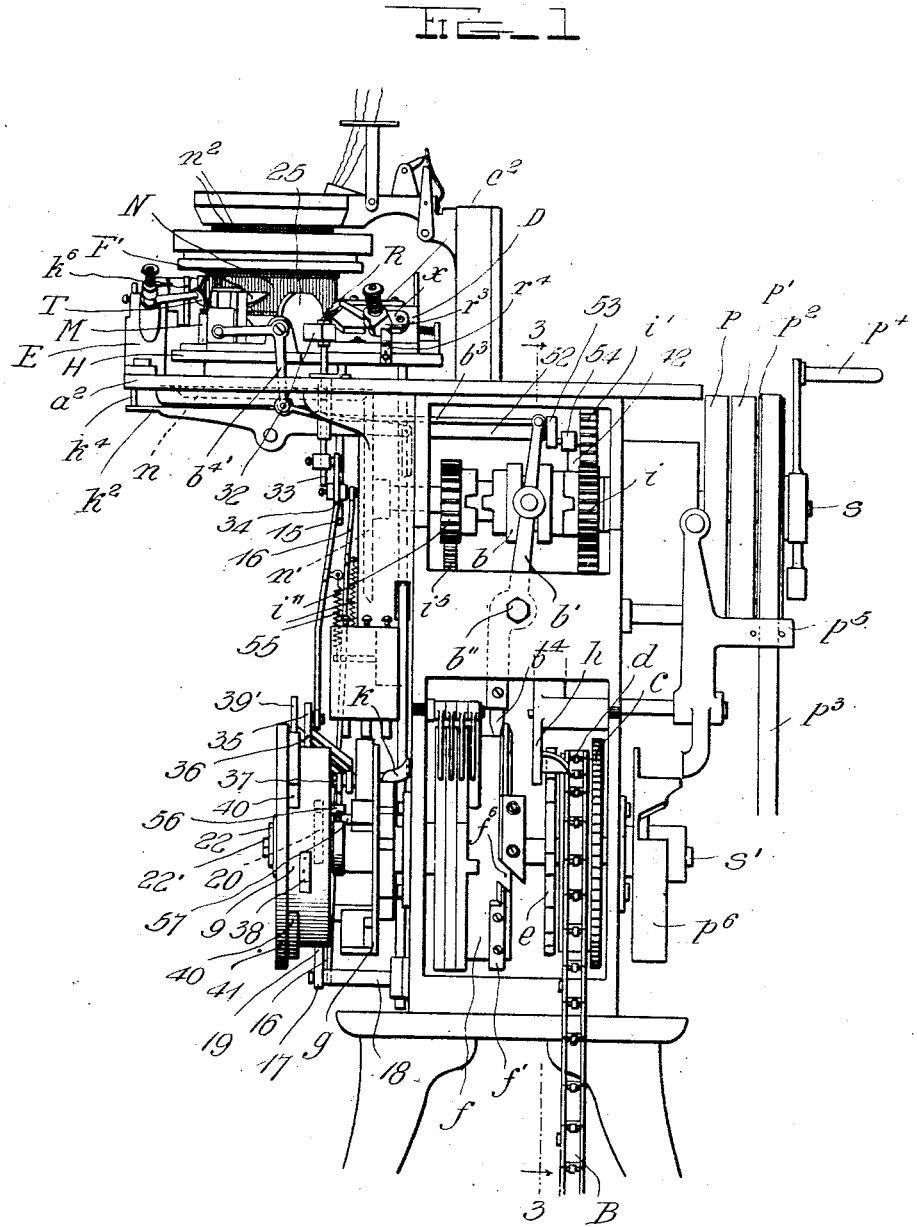
Witnesses
Inventor
HARRY. H. WEST
By
Attorneys

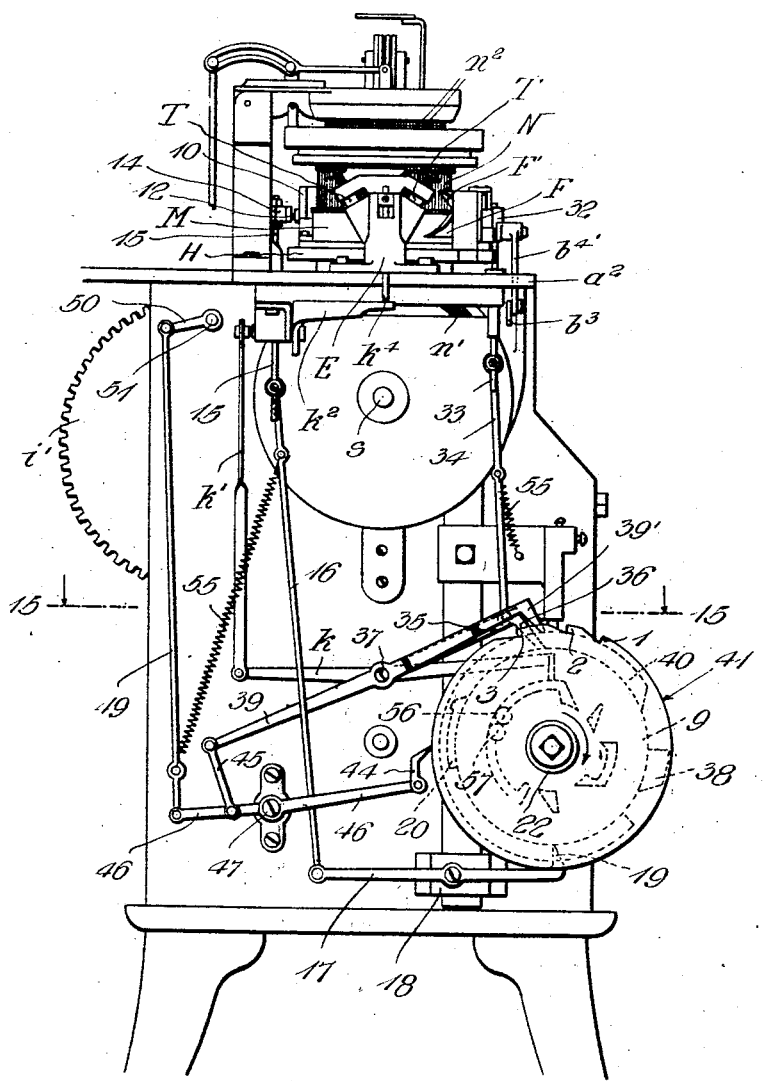

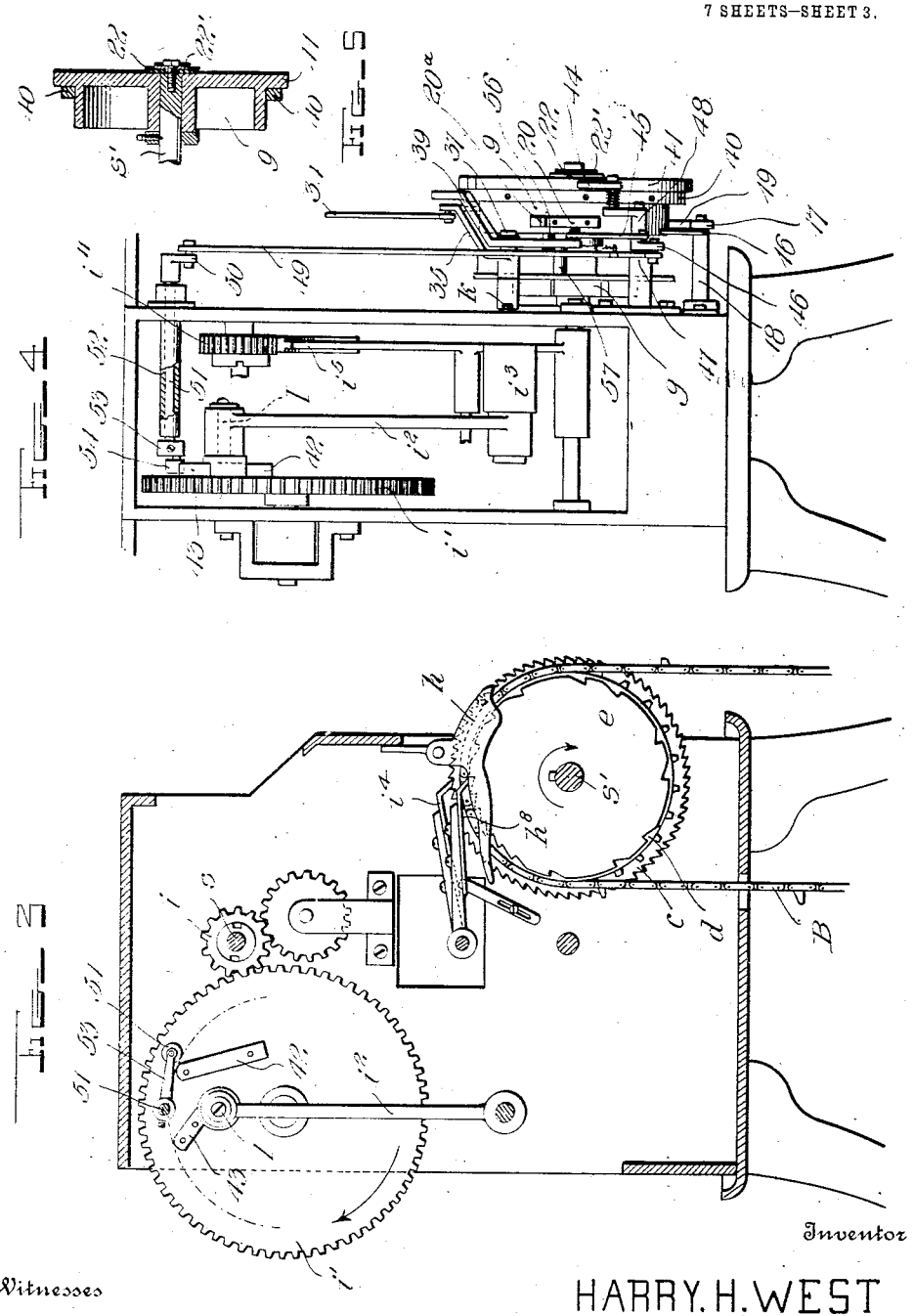

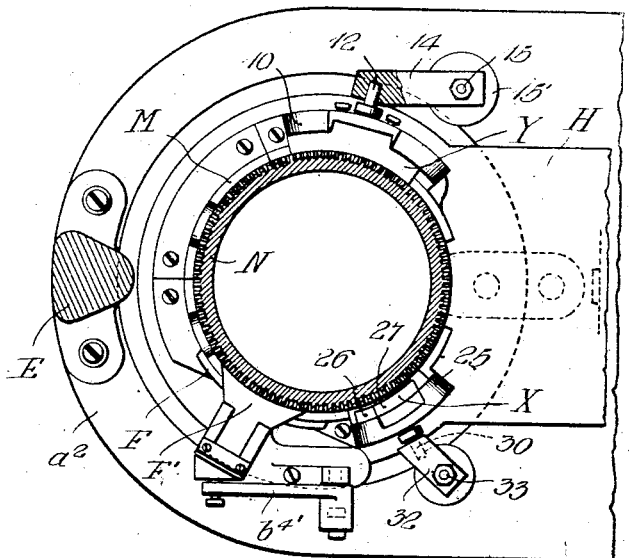
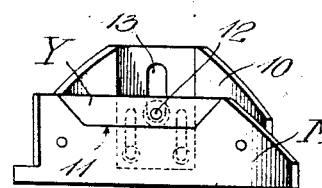
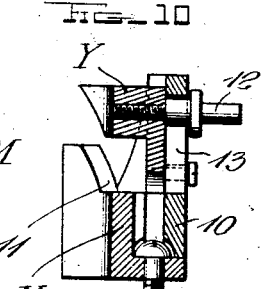
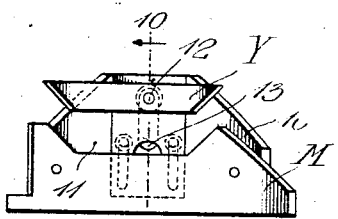
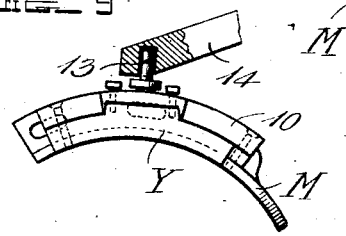
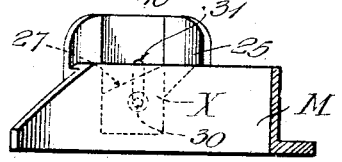

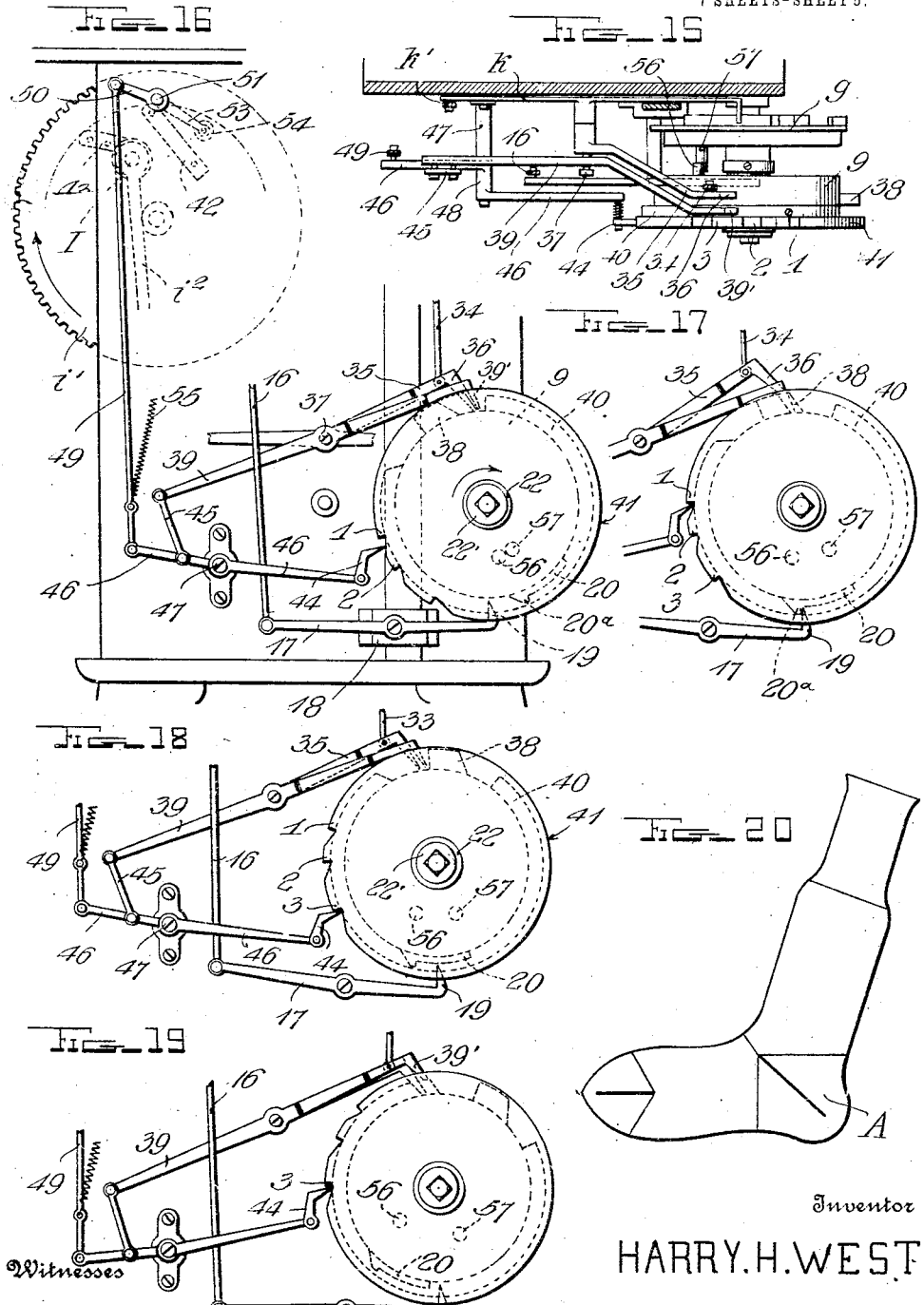

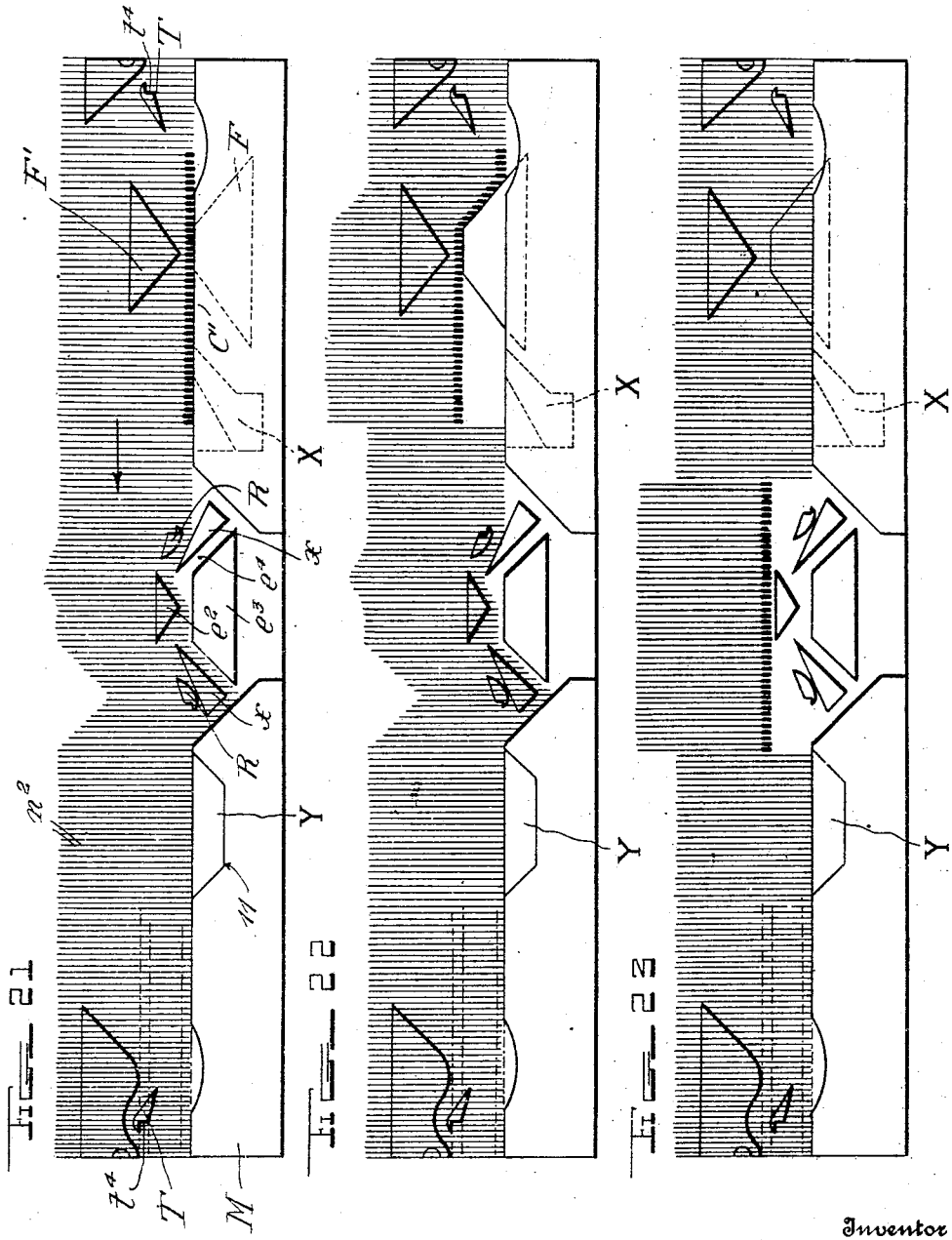

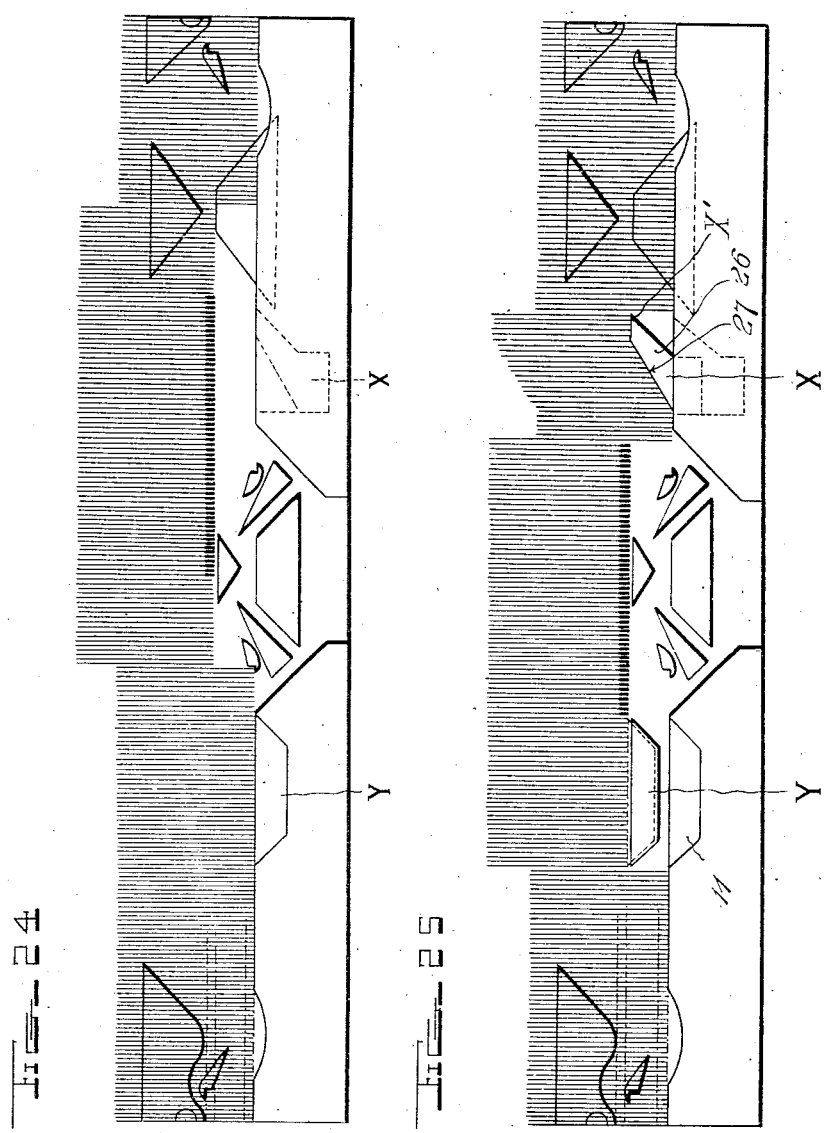

UNITED STATES PATENT OFFICE.

HARRY H. WEST, OF PLYMOUTH, PENNSYLVANIA.

CIRCULAR-KNITTING MACHINE.

1,122,560.   Specification of Letters Patent.   Patented Dec. 29, 1914.

Application filed March 4, 1914. Serial No. 822,434.

*To all whom it may concern:*

Be it known that I, HARRY H. WEST, a citizen of the United States, residing at Plymouth, in the county of Luzerne and State of Pennsylvania, have invented certain new and useful Improvements in Circular-Knitting Machines; and I do declare the following to be a full, clear, and exact description of the invention, such as will enable others skilled in the art to which it appertains to make and use the same.

This invention relates to improvements in circular knitting machines of the class especially constructed and adapted for knitting seamless stockings and socks.

The principal object of the invention is to provide simple and efficient mechanism for producing a stocking or sock which perfectly fits the foot and ankle without either stretching or wrinkling.

The hosiery in common use at the present day is fundamentally a narrow bag or tube with a pouch at one point for the heel and which is shaped by stretching and shrinking on form boards. Even after this process, the angle of the foot with the leg is such that if the human foot were held as the sock is shaped, the wearer would be walking on his toes or in shoes with heels six inches high. The human foot extends from the leg at about right angles, and when worn, the ordinary stocking above described, is stretched at the heel and wrinkled at the instep to accommodate the foot in this position. The only way to avoid these wrinkles in a stocking of this character is by keeping the stocking pulled up abnormally tight and the strain on the material at the heel and at the instep renders the best yarn frayable under slight wear.

This invention comprehends certain improvements which are especially applicable to what is known to the trade as the "Banner Knitting Machine," the general structure of which is shown in U. S. patent to Hemphill, No. 933,443, dated September 7, 1909, and by these improvements, the disadvantages of the ordinary stocking above pointed out are overcome and a stocking produced which will perfectly fit the human foot without stretching or wrinkling. This Hemphill patent mentioned above has reference to circular knitting machines for knitting stockings and socks in which the knitting is performed by a circular series or column of needles which are moved up and down in vertical grooves in the needle cylinder under the action of the knitting cams on the cam cylinder which encircles the needle cylinder, the knitting of the tubular portion of the work forming the leg and foot being performed in continuous circular courses by all the needles under a continuous rotary motion of the needle cylinder, the pouch knitting or "fashioning" for the formation of the heel and toe being performed in arc shaped courses by a part of the needles (one half being employed in these patented structures) under the reciprocatory motion of the needle cylinder.

From the above, it will be obvious that the needle carrying or knitting cylinder is revolubly but not endwise movable, the needle actuating devices or cams being nonrevoluble and normally stationary.

The pattern, as well as the wheels, etc., mounted on the cam shaft, are intermittently rotated at predetermined intervals and in one direction only, by means of controlling mechanism operatively connected with devices through the medium of which the cylinder is rotated at a relatively increased rate of speed while plain or circular knitting is being produced, and revolved at a greatly reduced speed while being actuated in a rotary reciprocatory manner during the formation of the heel and toe portions of the stocking. The power used is transmitted, as indicated in the drawing, through a belt adapted to run in one direction only and at a substantially uniform speed, the arrangement being such that when it is shifted onto one pulley, the speed of the needle cylinder is relatively increased and when in engagement with the other pulley, the speed is materially reduced, the machine automatically stopping and locking itself in stationary position when the belt is shifted onto the idler pulley.

Such parts only of the machine as may be necessary to show the connection and operation of the attachments for carrying out this invention will be illustrated herein.

In the accompanying drawings: Figure 1 represents a front elevation of a knitting machine constructed in accordance with this invention; Fig. 2 represents an end elevation thereof viewed from the left of the machine; Fig. 3 is a vertical section taken substantially on the line 3—3 of Fig. 1; Fig. 4 is a fragmentary rear elevation partly in section; Fig. 5 is a detail vertical section of the cam drum constituting a part of this invention; Fig. 6 is a horizontal detail sectional view on an enlarged scale taken through the needle cylinder immediately above the needle controlling cams, the knitting cams being omitted; Figs. 7, 8, 9 and 10 represent respectively one of the cams (Y) for throwing out certain needles preparatory to the narrowing operation, Fig. 7 being a front elevation viewed from the inside of the cam with the cam in lowered inoperative position; Fig. 8 is a similar view with the cam in raised or operative position; Fig. 9 is a plan view thereof with parts broken out; Fig. 10 is a vertical section on an enlarged scale taken on the line 10—10 of Fig. 8 looking in the direction of the arrow. Figs. 11, 12, 13 and 14 represent respectively the other cam for throwing out certain needles preparatory to the narrowing operation, Fig. 11 being a front elevation viewed from the inside of the cam with the cam in a lowered position; Fig. 12 is a similar view with the cam in raised or operative position; Fig. 13 is a top plan view thereof, and Fig. 14 is a vertical section taken on the line 14—14 of Fig. 12. Fig. 15 is a fragmentary horizontal section taken substantially on the line 15—15 of Fig. 2; Figs. 16, 17, 18 and 19 are fragmentary end views respectively of the machine showing the parts for controlling the needle cams (X Y) in their various positions: Fig. 20 is a view showing the article produced by this improved machine; Fig. 21 is a diagram of the inside of the cam cylinder with the needles on the lower working level in the position which is assumed during the circular knitting, the column of needles moving toward the left as shown by the arrow; Fig. 22 is a similar view with the long butt needles being raised into the upper or non-working level by the instep raise cam; Fig. 23 is a similar view with the long butt needles in raised inoperative position with the narrowing picks disposed ready to engage and elevate a needle and add it to the already raised needles at each reciprocation of the needle cylinder, the narrowing for the heel now commencing; Fig. 24 is a similar view with the widening picks in position to take down two needles at each reciprocation and the narrowing picks positioned to elevate or throw out of action one needle at each reciprocation; Fig. 25 is a similar view showing the parts in position for beginning the formation of the toe with the cams (Y X) in position for throwing up or into the non-working level sufficient needles at each end of the column of those already elevated to constitute one-half of the whole column of needles.

The drawings show the main instrumentalities of a knitting machine to which the present invention may be applied as comprising a tubular rotary needle cylinder N having a horizontal beveled gear $n$ secured to its lower end with which a driving gear $n'$ meshes. The mechanism for driving said gear $n$ is clearly shown in Figs. 3, 4 and 28 of the patent above referred to and includes a main drive shaft $s$ carrying what will be termed fast, slow and loose pulleys $p$, $p'$ and $p^2$ respectively on which a belt $p^3$ is adapted to be shifted automatically to vary the speed of the machine for knitting the different parts of the hose; for instance it is desirable that the machine operate rapidly when forming the tubular leg and foot of the stocking and slowly when reciprocating to form the heel and toe and when passing from the leg to the heel and from the foot to the toe. A handle $p^4$ is arranged at the outer end of this shaft $s$ for manually operating the shaft when desired.

A clutch member or hub $b$ is keyed to slide on the shaft $s$ and is provided with a peripheral groove for engagement by an operating or shifting lever $b'$ fulcrumed intermediately of its ends on the frame of the machine as shown at $b''$. This clutch is adapted to be moved either to the right or to the left to engage either the gear $i$ or the gear $i^{11}$ loosely mounted on the shaft $s$ when certain parts hereinafter described are to be operated.

Operatively connected with the gear $i$ is an arrangement of gears (not shown) which forms a compound speed gear and when the clutch $b$ is engaged with the gear $i$ and the belt $p^3$ shifted onto the fast pulley $p$ the shaft $s$ will be rapidly rotated and through the gears $n$ and $n'$ will rapidly revolve the needle cylinder N during the continuous rotary knitting.

The needle cylinder N is provided in its peripheral portion with uniformly spaced longitudinal grooves to receive a circular series of independent needles $n^2$ of different forms distinguished one from the others by the difference in the length of their laterally extending butts whereby they may be actuated by different needle controlling mechanism for different purposes. In the present embodiment about one-fourth of the total number of the needles have long butts and the remainder have short butts for a purpose to be described. These needles are frictionally held in the grooves of the cylinder by the usual spring bands and are vertically movable. A cam plate H is bored to receive the revoluble needle cylinder and is located above and contiguous to said gear $n$ and carries the main knitting or needle operating cams and the narrowing picks which are brought into action during the knitting of the stocking.

A non-revoluble needle supporting cam M practically surrounds the lower part of the needle cylinder and is secured to said cam plate H and is adapted to support the active needles at the normal lower level while circular knitting is being produced.

The relative arrangement, proportions, etc., of the principal operative parts as drawn are such that the needle cylinder N is revolved once per revolution of the primary shaft $s$. The shaft $s'$ on which the speed and yarn changing cams, etc., are mounted makes one complete revolution during the production of each stocking or piece of knitted work and is intermittently rotated, the means represented for intermittently rotating this cam shaft $s'$ and the members secured thereon, and also the mechanism for controlling said movements may be described substantially as follows: The fine toothed wheel $c$ and chain-carrying sprocket wheel $d$ are intermittently revoluble in unison on the shaft $s'$ by means of the positively reciprocating suitably mounted feed pawl $i^4$ taking its movements from the continuously revolving gear wheel $i'$ through pitman $i^2$ and arm $i^3$. A coarse ratchet toothed cam wheel $e$ is fixed to said shaft and is adapted to be rotated at varying intervals by swinging pawl $h^8$ movable back and forth in unison with said pawl $i^4$. The pattern chain carried by the member $d$ is composed of a suitable number of connected links and is provided with a predetermined number of properly disposed lugs.
Inter-gearing with, located at the back of and actuated by the continuously revoluble small gear $i$, which turns in one direction only, is suitably mounted the large gear $i'$ (see Figs. 1, 3 and 4) having the pitman $i^2$, jointed thereto and to the short arm $i^3$ of a pivoted rocking bell crank lever, the long arm $i^5$ of which has a segment-shaped free end with gear teeth cut in its periphery which are in continuous working engagement with the loosely mounted spur gear $i^{11}$ to drive it in a rotary reciprocating manner. The action of the slow speed pulley $p'$ keyed to gear $i$ operates by means of gear $i'$, segment $i^5$, gear $i^{11}$, etc., to rotate the shaft $s$ and the cylinder N back and forth when the clutch hub $b$ is moved toward the left, and interlocks with the gear $i^{11}$ and the last named gear revolves the shaft $s$, its speed ratio being very much reduced thereby, or, in other words, the driving belt will revolve pulley $p'$ several revolutions to one of the cylinder and by means of the arrangement of gear described the speed of the revolving knitting cylinder is increased with respect to the speed of the driving belt when producing circular work and materially decreased while knitting the heel and toe portions as when the cylinder is actuated in a rotary reciprocating manner.
To the front end of the intermittently movable cam shaft $s'$ is secured a cam $p^6$ for controlling the movements of the spring pressed belt shipper $p^5$ the latter being in yielding contact therewith. A cam drum $f$ and cam wheel $g$ fully described in the patent above referred to are also mounted on this shaft $s'$ and at the rear or left end of said shaft is mounted a cam drum 9 for a purpose to be described.

A horizontal spring pressed cam carrying block D is movably guided in an endwise direction toward and from the cylinder N and on which are mounted the main knitting or needle operating cams and the narrowing picks R. Mounted on this block and secured to its inner or working face is the upper central guide member $e^2$ and the lower central guard member $e^3$ shown in Figs. 21 to 25 and the space $e^4$ between them forms a path for guiding the needle butts. The oppositely disposed or right and left wedge shaped knitting cams $x$, $x$ usually termed "raise and draw cams" are also mounted on this block. The upper sides of said knitting cams when in use deflect the needles upwardly and the lower beveled sides deflect or draw the needles downwardly and the latter after passing thereunder engage the recessed cam member M and deflect the needles to the top edge thereof all being arranged whereby the device is adapted to impart to the traveling needles the usual wave like movement at the knitting point while the cylinder may be revolving in either direction.

The narrowing picks R which are carried by the cam block D each has an arm $r^3$ which when the block D is retracted engage stationary stops $r^4$ secured to the plate H whereby the shanks of the picks are swung upwardly and outwardly out of position to allow the needles to be depressed. These picks R are brought into operation at the beginning of the narrowing operation when the cam shaft $s'$ has been shifted to throw the clutch $b$ into engagement with the gear $i^{11}$ and the belt shipper $p^5$ operated to shift the belt $p^3$ into the slow pulley $p'$ whereby the reciprocation of the needle cylinder is produced.

Bolted to the table $a^2$ opposite the narrowing picks is a bracket E in which are pivotally mounted a pair of oppositely disposed spring pressed widening picks T which are operated by means of a rod $k^4$ controlled by a cam member on the cam shaft $s'$.

Mounted on the cam plate H are the instep raise and draw cams F and F' which are controlled by the clutch shifting lever $b'$ through the link $b^3$ and a bell crank lever $b'^4$ connected with said instep cams as is clearly shown in Fig. 1 of the drawings hereto attached.

At the narrowing and widening operation it is to be understood that all of the long butt needles, herein shown as one-fourth of the column, must be temporarily thrown out of action into the non-working level which is a higher level than that of the other needles, the latter continuing in service during this portion of the knitting. Concurrently with the change of movement of the cylinder from continuous circular to reciprocatory rotary knitting the instep cam device F is elevated by means of the horizontal connection $b^3$ jointed to the clutch shipper arm $b'$ whereby all the long butt needles are deflected upwardly by said cam and thrown out of action (see Figs. 22 and 23), the diagram shown in Fig. 22 showing this cam F operating to raise the long butt needles and the diagram 23 showing them after they have been raised by said cam. At the same time the short butt needles, about three-fourths of the column as herein shown, are standing in the lower or working plane and form a column arranged oppositely to the column of elevated needles and having a gap between the ends of the column. Upon actuating the cylinder in a rotary reciprocatory manner the action of the narrowing picks R alternately elevate out of action a short butt needle from each end of this column, the operation being continued until the desired narrowing point is attained. This action adds the short butt needles alternately to the ends of the row of the elevated long butt needles thereby decreasing the gap in the latter column and correspondingly increasing the gap in the working column of needles.

In the widening operation which commences immediately succeeding the narrowing part each pick T throws down two needles alternately from each end of the column of elevated or non-working needles to the normal working plane thereby adding to the length of the then remaining comparatively short column of working needles and at the same time increasing the gap between the ends of the column of the non-working needles. The narrowing picks are continued in action throughout the widening process and until the completion of the knitting of the heel or toe portion as the case may be and the resumption of circular knitting at which instant all the picks are rendered automatically inoperative.

In the half hose shown in Fig. 20, which is the product resulting from the improvements constituting this invention, the object is accomplished by the formation of a large heel knit on approximately three-fourths of the column of needles which needles are retained on the normal working level when the machine passes from circular to reciprocatory knitting for the narrowing for the heel; one-fourth of the column, which constitutes all of the long butt needles, is thrown out of action at the beginning of this reciprocatory knitting for the narrowing for the heel. After this heel has been knit in the usual manner by successive narrowing and widening processes all of the needles are thrown into action for the circular knitting to form the foot. When the foot has been completed and the toe is ready to be knit it is obvious that it will be necessary to throw one-half of the needles out of action prior to the narrowing operation in order that the stitches may be properly looped to close the toe. To accomplish this raising of the additional needles at the proper time certain automatically controlled cams are provided for elevating sufficient of the short butt needles on opposite sides of the column of long butt needles which were previously raised by the instep cam F prior to the positioning of the parts for the narrowing for the toe. These needle raising cams and the mechanism for operating and controlling them form the subject matter of this invention and they will now be described.

As shown applied in Figs. 1, 2 and 6, diagrammatically in Figs. 21 to 25 and in detail in Figs. 7 to 14, two cams Y and X are mounted in suitable housings 10 and 25 at opposite sides of the block carrying the stitch cams and in position to engage the short butt needles on opposite sides of the column C of long butt needles at predetermined intervals, said column as heretofore stated constituting about one-fourth of the entire column of needles.

The cam Y is preferably constructed as shown in detail in Figs. 7 to 10 having upwardly inclined ends and being concavo-convex longitudinally and mounted to slide vertically in said housing 10 and to seat when lowered into inoperative position in a recess 11 in the upper edge of the cam plate M. The upper edge of the cam Y is flush with the upper edge of the cam M when so seated as shown in Figs. 7 and 21 to 24.

A stud 12 extends laterally outward from the cam Y through a slot 13 in the housing 10 and is loosely engaged with a laterally extended arm 14 attached to a rod 15 guided in a suitable sleeve 15' extending through the base plate $a^2$. This rod 15 is adjustably connected with a pitman or rod 16 the lower end of which is pivotally connected with one end of a horizontally disposed lever 17. This lever 17 is fulcrumed intermediately of its ends on a suitable support 18 and its free end has an inturned nose 19 which is positioned in the path of a cam 20 on the drum 9. This drum 9 is loosely mounted on the left end of the shaft $s'$ and held in frictional engagement therewith by any suitable means, a leather disk 22 being here shown arranged for this purpose between the outer face of the drum and a metal disk 22' secured to the shaft $s'$. It is necessary that this drum be so held to adapt it to turn with the shaft $s'$ and also to permit it to turn on the shaft independently thereof by means to be described, its frictional engagement being sufficient to hold it against accidental turning on the shaft.

The cam X shown in detail in Figs. 11 to 14 and mounted outside the needle supporting cam M in the housing 25 is shown in the form of a substantially rectangular body slidable vertically in the housing 25 and having an obliquely disposed upper end 26 the inclined face 27 of which forms a riding surface for the needles which pass thereover and the straight terminal thereof elevates the needles into the non-working level (see Fig. 25) as will be hereinafter more fully described.

A stud 30 extends laterally outward from the body of the cam X through a slot 31 in the housing 25 and is loosely engaged with a block or arm 32 on the upper end of a rod 33 adjustably connected with a rod or pitman 34. The rod 34 is pivotally connected at its lower end with a lever 35 near the free end of said lever and which lever end is provided with a depending nose 36. The other end of this lever 35 is fulcrumed on a stub shaft 37 extending laterally from the machine frame. The nose 36 of the lever 35 is positioned in the path of a cam 38 on the drum 9 for a purpose to be described.

The drum 9 is provided on its periphery with cams 20, 38 and 40 disposed in concentric parallel planes, the cam 40 which extends around the greater portion of the drum 9 being here shown arranged near its outer end; cam 20 near the inner end of the drum and at a point opposite the middle of the cam 40, and cam 38 which is the shortest of the three and the highest is shown disposed in the intermediate path or plane between cams 20 and 40 and at a point opposite the space between the ends of cam 40. The drum 9 has a toothed rim 41 provided with a series of teeth, three being here shown numbered 1, 2 and 3 respectively and disposed varying distances apart, for a purpose to be described.

A lever 39 is fulcrumed intermediately of its ends on the stud shaft 37 which also carries the lever 35 and is provided at its free end with a lateral nose 39' positioned in the path of the long cam 40 which extends around the greater portion of the circumference of the drum 9 and holds said nose in elevated position during the greater portion of the revolution of the drum as will be further described hereafter. The other end of the lever 39 is connected by a link 45 with a lever 46 fulcrumed intermediately of its ends on a stub shaft 47 extending laterally from the machine frame. This lever 46 has its ends offset or arranged out of longitudinal alinement by means of a lateral tubular portion 48 arranged intermediately of its ends and through which the shaft 47 extends. The link 45 is connected with the outer short end of said lever 46 between the sleeve 48 and the terminal of said short end which latter is pivotally connected with one end of a pitman 49. The other end of this pitman 49 is pivotally connected with a crank arm 50 which is fixed on a stub shaft 51 which extends through a suitable bearing 52 arranged transversely of the machine frame. On the free end of this shaft 51 is fixed an arm 53 carrying a roller 54 which is positioned adjacent the inner face of the large gear $i'$ and is adapted to be engaged at predetermined periods by cams 42 and 43 secured to the inner face of said gear $i'$ (see Figs. 3, 4 and 16) for a purpose to be described.

A dog 44 is pivoted on the free end of the lever 46 and held in spring pressed engagement with the toothed rim 41 being designed to engage the teeth thereof at predetermined intervals as will be hereinafter described.

The levers 17, 35 and 39 are held with their noses in yieldable operative engaging position by means of suitable springs 55 positioned at any desired or suitable point for so holding them.

During the knitting of the leg, heel and foot of the stocking the drum 9 is turned slowly by each movement of the cam shaft $s'$ on which it is frictionally held in the manner above described, being carried around with said shaft by the pins 56 and 57 one of which is mounted on the drum 9 and the other on an adjacent element on the cam shaft $s'$ here shown on the cam wheel $g$.

The nose 39' of the lever 39 which controls the position of the roller 54 and consequently the turning of drum 9 on shaft $s'$ travels on the long cam 40 of said drum 9 and is held thereby in raised position as shown in Fig. 2 during the knitting of the leg, heel and foot of the stocking. The rear end of this lever 39 and of the lever 46 to which it is connected are thereby depressed whereby the upper end of the pitman or rod 49 is drawn down thus lowering the end of the arm 50 and elevating the free end of arm 53 to position the roller 54 out of the path of the cams 42 and 43 carried by the large continuously rotating gear wheel $i'$ (see Fig. 3).

The noses 19 and 36 of the levers 17 and 35 respectively also travel on the cam drum 9 without being engaged by their actuating cams during these knitting operations and hence the cams Y and X controlled thereby remain inactive during this period. It will thus be obvious that this drum 9 performs no function during the knitting operations above mentioned.

When the leg of the stocking has been nearly completed by knitting in circular courses and just prior to the narrowing for the heel, the parts of the machine are disposed as shown in Fig. 21, all the needles being in operative position, and the turning of the cam shaft $s'$ which is controlled by the pattern chain B and cam wheel $e$ brings cam $p^6$ into engagement with the belt shipper $p^5$ and shifts the belt $p^3$ from the fast pulley $p$ on which it has been operating during the circular knitting onto the slow pulley $p'$. During this shifting of the belt from the fast to the slow pulley the speed of the cylinder is decreased gradually in a well known manner. After this shifting of the belt the clutch lever $b'$ is moved to the left and simultaneously with this shifting of the lever $b$ the instep cam F is raised through rod $b^3$ below crank $b^4$ connected with said clutch shifting lever, and all of the long butt needles C, here constituting one-fourth of the entire column are raised to the non-working level as shown in Figs. 22 and 23 and the needle cylinder is then ready for reciprocatory knitting to form the heel.

At the end of the circular knitting just before the beginning of the reciprocatory knitting the needle cylinder N stands still for a short period, and this period of rest also occurs at the end of each reciprocatory stroke. These rests are due to the lost motion occurring when the wrist pin connection of the pitman $i^2$ passes from one side to the other of the dead center of the gear $i'$ which is a distance of about an inch and a quarter, more or less; also to the taking up of the back lash which occurs between the teeth of the segment gear and pinion $i''$ and between the teeth of the bevel gears $n$ and $n'$ which latter takes place immediately following that of segment $i^3$ and gear $i'$. This short interval during which the cylinder remains stationary is utilized later in the knitting of the stocking just prior to the narrowing for the toe for raising the cams Y and X for a purpose to be described.

When the cylinder changes from circular to reciprocatory knitting after the completion of the leg the large heel shown at A in Fig. 20 is knit on the short butt needles which remain on the working level and which constitute three-fourths of the entire column, by first narrowing and then widening in the usual manner as above described, it being understood that when the narrowing is completed the drum turns and throws in the widening picks, then remains stationary until the widening is completed and the machine throws off the heel.

After the heel has been knit the lever $b'$, under the turning of the cam drum $f$ which is effected by means of the pawl $h^3$ engaging a predetermined tooth on the cam wheel $e$, is again shifted to the right to position the parts for causing the circular movement of the needle cylinder as above described. The foot is then formed in circular courses in a manner similar to the leg and shortly before the completion thereof the turning of shaft $s'$ by means of the pawl $h^3$ engaging the proper tooth of the wheel $e$ shifts the belt to the slow pulley and then the lever $b'$ is moved to the left to cause clutch $b$ to be again shifted into engagement with the gear $i''$ for changing the movement of the cylinder from continuous rotary to reciprocatory. Simultaneously with this shifting of lever $b'$ the instep cam F is raised as above described and the cylinder again stands still before beginning its reciprocatory movement for the knitting of the toe. During this interval while the cylinder is still the needle raising cams Y and X are elevated and positioned as shown in Fig. 25 at each side of the knitting cams $x$. This raising of the cams Y and X occurs when the drum 9 has been turned sufficiently by shaft $s'$ which is rotated by the engagement of the pawl $h^3$ with the proper teeth on the wheel $e$, to cause the nose 39' of the roller controlling lever 39 34 to drop off the straight end of the long cam 40 into the position shown in Fig. 16 and this dropping of this lever through the action of link 45 and pitman 49 positions the roller 54 in the path of cams 42 and 43. The continued turning of the gear $i'$ in the direction of the arrow shown in Fig. 16 causes the cam 42 to pass under the roller 54 and raise it a predetermined distance, thereby lowering the pitman 49 and with it the outer end of the lever 46 whereby the dog 44 is caused to engage the tooth 1 in the rim 41 of the drum 9, (see Figs. 16 and 17,) and turn said drum on the shaft $s'$ a predetermined distance sufficient to cause the projection $20^a$ on cam 20 to pass under the nose 19 of lever 17 and raise said lever, carrying with it the rod 16 connected with the needle raising cam Y which latter is thus lifted into position to raise at one end of the column C the desired number of short butt needles out of action as shown in Fig. 25. This turning of drum 9 on shaft $s'$ by the dog 44 moves the stud 56 away from the stud 57 and thus prevents the drum from being turned by the shaft $s'$, the position of said studs 56 and 57 during this turning of drum 9 by dog 44 being shown clearly in Figs. 17 to 19. Immediately after these needles are raised the cam projection $20^a$ passes from under nose 19 of lever 17 and causes the cam Y to drop slightly below the lower ends of the needles just raised thereby into the position shown in Fig. 25 whereby sufficient space is left between the upper edge of said cam Y and the needle ends to prevent any danger of the cam engaging said needle ends on the return or first forward stroke of the cylinder for the reciprocatory knitting.

The cam Y is raised and dropped slightly to the position shown in Fig. 25 just before the beginning of the first reciprocatory stroke of the needle cylinder and the movement of the cylinder on this stroke follows so quickly that there is not sufficient time to lower the cam to its seat 11 without danger of injury to the short butt needles which remain in operative position, hence the cam 20 is made sufficiently long to retain it under the nose 19 of the lever which controls the position of cam Y until the cylinder makes its return or first forward stroke for reciprocatory knitting when the cam 20 moves from under nose 19 and causes rod 16 and the cam Y connected therewith to drop to the position shown in Figs. 21, 22, 23 and 24. Simultaneously with the raising of cam Y, the cam X is raised which is accomplished by the passage of the cam 38 on the drum 9 under the nose 36 of the lever 35 which raises said lever and elevates the rod 34 and cam X carried thereby into the position shown in Fig. 25, so that the needles on top of this cam X and the needles passing thereover will be raised into the non-working level. The elevation of the cams Y and X raises the required number of short butt needles at each end of the non-working column C to throw out one-half of the entire column of needles which is necessary prior to the narrowing operation for the toe, it being obvious that an equal number of needles must be disposed in the working and non-working columns respectively during this operation in order that the loopers may properly operate for closing the toe after the widening operation has been completed. As shown in Fig. 6 the remote ends of these cams Y and X are disposed at diametrically opposite points to insure the raising thereby into inoperative position, prior to the narrowing for the toe, of exactly one-half of the entire column of needles. The cam Y being positioned and held as shown in Fig. 25 provides sufficient space between its lower edge and the upper edge of cam M to permit the passage of the butts of the operative short butt needles during the first forward reciprocatory stroke of the cylinder. After these cams Y and X have been raised, the cylinder begins its return or first forward stroke for reciprocatory knitting and when the last needle to the left of cam X between said cam and the long butt needles has passed the point X' of said cam the small cam 43 on the gear wheel $i'$ has in the meantime passed under the roller 54 and lowered the rod 49 causing the dog 44 to engage the tooth 2 of the drum 9 and turn said drum on the shaft $s'$ a distance sufficient to cause the cam 38 to pass from under the nose 36 of lever 35 (see Fig. 18) thus causing said nose to drop and carry with it the cam controlling rod 34 thereby lowering the cam X into inoperative position as shown in Figs. 21 to 24, leaving the needles raised thereby in the non-working level. The cylinder then starts on its return or backward stroke and before it reaches its extreme limit thereof the large cam 42 again lifts roller 54 owing to the fact that the large gear $i'$ has in the meantime made a complete revolution and thus brought cam 42 again into the path of the roller 54, and through rod 49 and lever 46 causes dog 44 to engage tooth 3, of the drum rim 41 (see Fig. 19) and turn said drum sufficiently to cause cam 20 to pass from under nose 19 of lever 17 thereby pulling rod 16 down and lowering cam Y into its seat 11 in the cam plate M out of the way of the needles.

Simultaneously with the lowering of cam Y the nose 39' of lever 39 rides up on the beveled end of cam 40 and thereby moves the roller 54 out of the path of the cams 42 and 43 where it is held by said engagement of nose 39' with the long cam 40 and the machine is then ready for the narrowing for the toe, which is then knit in the usual manner by first narrowing and then widening and finally closing the toe along the edges of the gores when the stocking is complete.

In the operation of this machine when the parts are in position for circular knitting to produce the leg of a stocking the machine is set into action by the belt shipper $p^5$ thereby automatically shifting the driving belt from the idler pulley onto the loosely revoluble quick speed driving pulley $p$. The belt while thus passing onto the driving pulley $p$ will necessarily cross the intermediate or slow speed pulley $p'$ thus starting the machine into knitting action more slowly and with less strain upon it than if the pulley $p$ were located immediately contiguous to the idle pulley.

The first movement of the revolving knitting cylinder carries the depressed short butt needles in a straight line past the face of the rear knitting cam $x$, the outer ends of the immediately following long butt needles at the same time engaging the cam $e^2$ and being deflected into the path $e^4$ thereby positioning them to engage the downwardly deflecting surface of said rear cam, and passing thereunder while making the first stitch at the same instant that the last of the short butts pass the face of the cam. Simultaneously with this operation the spring of the cam block D automatically advances it and its narrowing picks to the normal working level close to the surface of the revolving needle cylinder, the relation of the several members being substantially as represented in diagram in Fig. 21. In this figure the lower dotted line shown above the edge of the cam M indicates the normal working path of the butts and corresponding with the production of circular or plain knitting. The coöperation of the revolving knitting cylinder and the members of the now positioned cam block D together with the usual cams cause the moving needles to successively receive therein the yarn from properly positioned guides thereby converting it into new loops and at the same time casting off the old loops or stitches from the tops of the needles into the web revolving with the cylinder. This action of the machine then produces plain or circular knitting each revolution of the cylinder corresponding with one row or course of stitches.

The machine continues at the normal fast speed and without change to knit circular work, as in producing the leg portion of the stocking until the advancing pattern chain B brings one of the double or high lugs into coöperation with the swinging pawl controlling member $h$. In the meanwhile, however, the cam shaft $s'$ has been advanced about one-sixth of a revolution. At this point, or as determined by the relative position of the high lug on the pattern chain and the members controlled by the resulting movement of shaft $s'$ the first yarn and speed changing actions take place to produce the narrowing for the heel of the stocking. That is to say the engagement of the member $h$ with the proper lug on the pattern chain B allows the lug by means of the pawl $h^8$ to move the ratchet wheel $e$ a predetermined distance thereby correspondingly rotating the cam wheel $f$ and its shaft $s'$ and at the same time causing the lower end $b^4$ of the clutch lever $b'$ to be deflected laterally through an opening $f^6$ of the cam rib $f'$ to the outer or right side, thus sliding the clutch member $b$ to the left into engagement with gear $i''$ thereby also shifting the continuously running belt from pulley $p$ onto pulley $p'$. This materially reduces the speed and at the same time changes the movement of the cylinder from continuous circular to reciprocatory rotary. Concurrently with said change the instep cam F is elevated by means of the horizontal connection $b^3$ jointed to the clutch shipper arm $b'$ whereby all the long butt needles are deflected upwardly by said cam out of action into the non-working level which is indicated by the double row of dotted lines at the left of Fig. 22. This Fig. 22 shows the instep cam F in the act of elevating the long butt needles, which in this machine constitute about one-fourth of the entire column of needles. All these long butt needles which as before stated constitute about one-fourth of the total number in the cylinder are now elevated into the non-working plane as shown in Fig. 23 and are out of action while the machine in its reciprocating movements forms the narrowing for the heel. This narrowing operation is performed by the joint action of the cylinder and the self dropping angularly swinging narrowing picks R, R, whereby a short butt needle is thrown up alternately out of action from each end of the column of moving needles during each double reciprocation of the cylinder. This narrowing process is continued until the desired point has been reached which is controlled by a lug properly positioned on the pattern chain which co-acts with the member $h$ to rotate the cam shaft $s'$ and through the medium of a properly positioned cam on the shaft $s'$ the members $k, k'$ and $k^2$ elevate the gage plate $k^6$ and the two self rising widening picks T controlled by said plate member so that the recessed portions $t^4$ of said picks are positioned in the path of the inactive short butt needles which have just been elevated by the narrowing picks R, the cylinder still moving in a rotary reciprocatory manner. The function of these widening picks T is to alternately deflect or throw down into action a pair of short butt inactive needles from each end of the gap in the column of elevated or idle needles during each double reciprocation of the needle cylinder. While this is taking place the narrowing picks R are kept working thus producing the well known "two and one" knitting action. This knitting action is continued until the advancing pattern chain carries the proper lug into engagement with the member $h$ for releasing and rotating the cam shaft and its members a predetermined distance to properly position the cam $f$ to engage the lower end of the clutch lever $b$ to shift the clutch to the right to engage the gear $i$ and change from reciprocatory to circular knitting and at the same time to shift the driving belt onto the pulley $p$ to resume the quick speed circular knitting to produce the foot portion of the stocking.

The continued quick speed rotation of the cylinder operates to knit the circular or plain portion of the foot and changes to slow just before the narrowing for the toe is to be produced. Then the operation above described relative to the actuation of cams X and Y preparatory to the narrowing for the toe is performed; the toe narrowing and widening are effected in the usual manner and after the knitting of a few circular courses about twenty, more or less, which are utilized in seaming in a well known manner the stocking is complete.

After the needle cylinder has passed from reciprocatory knitting at the end of the widening operation for the toe onto circular knitting and has formed the courses for the loopers hold the pawl $h^8$ engages a predetermined tooth on the wheel $e$ and turns shaft $s'$ a sufficient distance to operate cam wheel $p^6$ and shift the belt onto the slow pulley $p'$. Simultaneously with this movement the yarn finger arms are lifted out of the path of the needle hooks and the completed stocking is pressed off. The cam plate H is then lowered ready for transferring. The pawl $h^5$ then engages another tooth of wheel $e$ and turns shaft $s'$ and shifts the belt from the slow pulley $p'$ onto the loose pulley $p^2$ and the machine is thereby stopped or thrown out of operation.

At the beginning of the operations described in the above paragraph the cam drum 9 is stationary with the studs 56 and 57 in the position shown in Fig. 19. During said operations the turning of shaft $s'$ slowly advances pin 57 until it again engages the pin 56 on said drum 9 and turns the drum with the shaft into the position shown in Fig. 2 which shows the position of these parts at the beginning of the knitting of the stocking leg.

From the above description it will be obvious that the operation of the machine as set forth produces a stocking having the usual leg, foot, and toe in combination with an enlarged heel knit on three-fourths of the needles of the column and that the formation of this large heel produces a stocking with the foot disposed substantially at right angles to the leg and with the necessary quantity of material in said foot prevent stretching at the heel and wrinkling at the instep and to avoid the necessity of pulling up the stocking tight at the front thereof which has become heretofore necessary to cause it to fit properly over the instep and ankle without wrinkling.

I claim as my invention:

1. In a circular knitting machine, the combination of a revoluble needle cylinder, a cam shaft, means on said cam shaft for controlling the knitting operation of said cylinder, a cam drum mounted to turn on said cam shaft, means for holding said drum in frictional engagement with said shaft to adapt it to be turned therewith, means for raising a portion of the needles in said cylinder at fixed intervals, means for raising a predetermined number of needles at each side of the column of previously raised needles just before the narrowing operation begins, and means controlled by said cam drum for operating said last mentioned needle raising means at predetermined intervals.

2. In a circular knitting machine, the combination with a revoluble needle cylinder and a cam shaft, means on said cam shaft for controlling the knitting operations of said cylinder, of a cam drum mounted to turn on said cam shaft, means for holding said drum in frictional engagement with said shaft to adapt it to be turned therewith, means for raising a portion of the needles in said cylinder at fixed intervals, spaced cams arranged adjacent said cylinder for raising a predetermined number of needles at each end of the column of previously raised needles, and automatically controlled means on said cam drum for raising and lowering the needle raising cams at predetermined intervals.

3. In a circular knitting machine the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, and coöperating means on said gear and drum for controlling the actuation of the cams which raise the auxiliary needles.

4. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said drum and gear for controlling the actuation of the cams which raise said auxiliary needles, said drum being controlled by the knitting mechanism for bringing the cams thereon and on said gear into operation.

5. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said drum and gear, and connected levers and rods operable by the cams on said drum and gear for controlling the actuation of the cams which raise said auxiliary needles, the turning of said drum with said shaft being controlled by the knitting mechanism.

6. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said drum and gear, and connected levers and rods operable by the cams on said drum and gear for throwing into operation the cams for raising the auxiliary needles.

7. In a circular knitting machine the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level of both ends of the column of the first raised needles a predetermined number of auxiliary needles, cams on said drum, levers connected with said auxiliary needle raising cams and having noses positioned in the paths of the cams on said drum, and means for turning said drum on said shaft to move said drum carried cams under the noses of said levers for raising and lowering the auxiliary needle raising cams into operative and inoperative positions respectively.

8. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said drum, levers connected with said auxiliary needle raising cams and having noses positioned in the paths of the cams on said drum, and means for turning said drum on said shaft to move said drum carried cams under the noses of said levers for raising and lowering the auxiliary needle raising cams into operative and inoperative positions respectively, said drum turning means being controlled by the shifting of the knitting mechanism into position for narrowing for the toe.

9. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said drum, levers connected with said auxiliary needle raising cams and having noses positioned in the paths of the cams on said drum, and means operable by said gear for turning said drum on said shaft to move said drum carried cams under the noses of said levers for raising and lowering the auxiliary needle raising cams into operative and inoperative positions.

10. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, cams on said drum, levers connected with said auxiliary needle raising cams and having noses positioned in the paths of the cams on said drum, means operable by said gear for turning said drum on said shaft to move said drum carried cams under the noses of said levers for raising and lowering the auxiliary needle raising cams into operative and inoperative positions, another cam on said drum, and, a lever connected with the means for turning said drum, said lever having a nose positioned in the path of said last mentioned drum carried cam whereby said drum turning means is thrown into and out of operation by the passage of said cam under said lever nose.

11. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, means on said drum operable on the turning thereof to control the actuation of said auxiliary needle raising cams, cams on said gear, a pivotally mounted arm having its free end positioned adjacent said gear and adapted to be swung into the path of said gear carried cams, means for holding said arm normally out of the path of said cams, and means brought into operation by the shifting of the knitting mechanism prior to the narrowing for the toe for throwing said arm into the path of said gear carried cams.

12. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, means on said drum operable on the turning thereof to control the actuation of said auxiliary needle raising cams, cams on said gear, a pivotally mounted arm having a roller on its free end positioned adjacent said gear and adapted to be swung into the path of said gear carried cams, a rod movable to throw said roller into and out of the path of said gear carried cams, means connected with said rod for turning said drum when the roller is moved into the path of said gear carried cams, and coöperating means on said drum and rod for moving said roller into and out of the path of said gear carried cams.

13. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, means on said drum operable on the turning thereof to control the actuation of said auxiliary needle raising cams, cams on said gear, a pivotally mounted arm having a roller on its free end positioned adjacent said gear and adapted to be swung into the path of said gear carried cams, a rod movable to throw said roller into and out of the path of said gear carried cams, a spring pressed dog connected with said rod for engaging said drums and turning it when the roller is moved into the path of said gear carried cams, and coöperating means on said drum and rod for moving said roller into and out of the path of said gear carried cams.

14. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, means on said drum operable on the turning thereof to control the actuation of said auxiliary needle raising cams, cams on said gear, a pivotally mounted arm having a roller on its free end positioned adjacent said gear and adapted to be swung into the path of said gear carried cams, a rod movable to throw said roller into and out of the path of said gear carried cams, said drum having teeth in its periphery, a spring pressed dog connected with said rod for engaging one of the teeth of said drum for turning it when the roller is moved into the path of said gear carried cams, and coöperating means on said drum and rod for moving said arm into and out of the path of said gear carried cams.

15. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, means on said drum operable on the turning thereof to control the actuation of said auxiliary needle raising cams, cams on said gear, a pivotally mounted arm having a roller on its free end positioned adjacent said gear and adapted to be swung into the path of said gear carried cams, a rod movable to throw said roller into and out of the path of said gear carried cams, a lever fulcrumed intermediately of its ends and connected at one end with said rod and having an inturned nose at its other end, and a cam on said drum positioned in the path of said nose for actuating said lever and throwing said dog into and out of engagement with said drum.

16. In a circular knitting machine, the combination with a revoluble needle cylinder having needles slidable therein, a cam shaft, knitting mechanism controlled by said cam shaft, a cam drum mounted to turn with and on said shaft, a continuously rotating gear, means for elevating a column of said needles into the non-working level at a predetermined point, cams for elevating to the non-working level at both ends of the column of the first raised needles a predetermined number of auxiliary needles, a long cam mounted on said drum, a lever fulcrumed intermediately of its ends and having a nose at one end positioned in the path of said long cam, cams on said gear, a rod connected with the other end of said lever and having a roller adapted to be positioned in the path of the gear carried cams, a spring pressed dog carried by said rod, the rim of said drum having a plurality of teeth in the periphery thereof disposed in the path of said dog, and means for turning said drum just prior to the narrowing for the toe to remove said long cam from under said lever nose, and thereby shift said rod to position the roller carried thereby into the path of the gear carried cams and concurrently to position the dog for engagement with one of the teeth of said drum when the roller is raised by its engagement with one of the cam carried gears.

In testimony whereof I have hereunto set my hand in presence of two subscribing witnesses.

HARRY H. WEST.

Witnesses:
CHAS. P. AGEN,
EMMA HEDDEN.